United States Patent
Rodgers et al.

(10) Patent No.: US 8,397,426 B2
(45) Date of Patent: *Mar. 19, 2013

(54) MOUSETRAP

(75) Inventors: Brendyn Murray Rodgers, Blackburn (AU); Duncan McLeod Watson, West Ryde (AU); Jeffrey West, Williamstown (AU)

(73) Assignee: Reckitt Benckiser (Australia) PTY Limited, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/216,782

(22) Filed: Aug. 24, 2011

(65) Prior Publication Data

US 2011/0302822 A1     Dec. 15, 2011

Related U.S. Application Data

(63) Continuation of application No. 12/351,374, filed on Jan. 9, 2009, which is a continuation of application No. 10/595,596, filed as application No. PCT/GB2004/004423 on Oct. 20, 2004, now Pat. No. 7,506,471.

(30) Foreign Application Priority Data

Oct. 31, 2003  (GB) .................................. 0325446.3

(51) Int. Cl.
  *A01M 23/00*   (2006.01)
  *A01M 23/10*   (2006.01)
  *A01M 23/24*   (2006.01)
  *A01M 23/26*   (2006.01)

(52) U.S. Cl. ............... 43/85; 43/88; 43/58; 43/77; 43/81

(58) Field of Classification Search ................ 43/85, 88, 43/58, 77, 81, 73–75, 71
See application file for complete search history.

(56) References Cited

U.S. PATENT DOCUMENTS

| | | | | |
|---|---|---|---|---|
| 31,651 A * | 3/1861 | Demming et al. | ................ | 43/74 |
| 89,300 A * | 4/1869 | Fenn | ................. | 43/74 |
| 89,429 A * | 4/1869 | Owen | .............. | 43/74 |
| 106,107 A * | 8/1870 | Ball | ................ | 43/74 |
| 210,578 A * | 12/1878 | Terrell | .............. | 43/73 |
| 309,781 A * | 12/1884 | Hall | ................ | 43/75 |
| 477,966 A * | 6/1892 | Steiner | ............. | 43/85 |
| 539,900 A * | 5/1895 | Hulings | ............ | 43/74 |
| 714,281 A * | 11/1902 | Chasse | ............. | 43/85 |
| 749,790 A * | 1/1904 | Hendryx | ............ | 43/74 |
| 849,070 A * | 4/1907 | Hutsinger et al. | ............ | 43/75 |
| 856,889 A * | 6/1907 | Lamp | .............. | 43/75 |
| 901,851 A * | 10/1908 | Thompson | .......... | 43/85 |

(Continued)

FOREIGN PATENT DOCUMENTS

| | | |
|---|---|---|
| DE | 4335052 A1 * | 4/1995 |
| FR | 2614179 A1 * | 10/1988 |

(Continued)

*Primary Examiner* — Darren W Ark
(74) *Attorney, Agent, or Firm* — Norris McLaughlin and Marcus PA (57) ABSTRACT

Disclosed is a mousetrap having an enclosure with a rotatable top part having a downwardly extending strike plate within the enclosure, and a bottom part having an upwardly extending catch plate within the enclosure, an aperture in each of the top part and the bottom part which are in substantial alignment when the mousetrap is set, and a trigger mechanism, wherein the mousetrap is set to incapacitate or kill the mouse by the manual rotation of the top part relative to the bottom part when a mouse activates the trigger mechanism causing the top part to rotate relative to the bottom part and thereby incapacitating or killing the mouse between the strike plate and the catch plate.

17 Claims, 9 Drawing Sheets

U.S. PATENT DOCUMENTS

| | | | | |
|---|---|---|---|---|
| 941,988 | A * | 11/1909 | Gunn | 43/75 |
| 1,077,452 | A * | 11/1913 | Burke | 43/73 |
| 1,176,815 | A * | 3/1916 | Cowan | 43/67 |
| 1,213,997 | A * | 1/1917 | Arrioja | 43/74 |
| 1,214,060 | A * | 1/1917 | Mutz | 43/74 |
| 1,222,406 | A * | 4/1917 | Jakab | 43/61 |
| 1,288,712 | A * | 12/1918 | Siemieczko | 43/74 |
| 1,479,283 | A * | 1/1924 | Conrad | 43/74 |
| 1,510,346 | A * | 9/1924 | Smith | 43/74 |
| 1,512,513 | A * | 10/1924 | Ward | 43/73 |
| 1,523,375 | A * | 1/1925 | Wirtjes | 43/75 |
| 1,578,196 | A * | 3/1926 | Hills | 43/67 |
| 1,645,225 | A * | 10/1927 | Brzykcy | 43/74 |
| 1,659,767 | A * | 2/1928 | Curtis | 43/74 |
| 1,708,659 | A * | 4/1929 | Brzykcy | 43/74 |
| 1,758,952 | A * | 5/1930 | Kness | 43/74 |
| 1,796,380 | A * | 3/1931 | Lyden | 43/74 |
| 1,989,174 | A * | 1/1935 | Cyrus | 43/85 |
| 2,059,937 | A * | 11/1936 | Ellis | 43/81 |
| 2,096,368 | A * | 10/1937 | Ward | 43/73 |
| 2,101,788 | A * | 12/1937 | Benson | 43/74 |
| 2,120,812 | A * | 6/1938 | Rinaldy et al. | 43/85 |
| 2,170,470 | A * | 8/1939 | Chappell | 43/74 |
| 2,197,121 | A * | 4/1940 | Blasen | 43/74 |
| 2,242,648 | A * | 5/1941 | La Rocca | 43/85 |
| 2,250,823 | A * | 7/1941 | Conners | 43/67 |
| 2,256,048 | A * | 9/1941 | Evans | 43/75 |
| 2,416,481 | A * | 2/1947 | Hollenbeck | 43/81 |
| 2,427,148 | A * | 9/1947 | Luckton | 43/85 |
| 2,433,913 | A * | 1/1948 | Kness | 43/74 |
| 2,454,476 | A * | 11/1948 | Price | 43/60 |
| 2,460,417 | A * | 2/1949 | Goostrey | 43/61 |
| 2,471,540 | A * | 5/1949 | Phillips | 43/71 |
| 2,481,800 | A * | 9/1949 | Tyler | 43/85 |
| 2,506,055 | A * | 5/1950 | Benson | 43/85 |
| 2,510,655 | A * | 6/1950 | Price et al. | 43/85 |
| 2,578,856 | A * | 12/1951 | Story | 43/85 |
| 2,594,182 | A * | 4/1952 | Kness | 43/74 |
| 3,339,306 | A * | 9/1967 | Yakel et al. | 43/85 |
| 3,530,613 | A * | 9/1970 | Brubakken | 43/85 |
| 3,688,432 | A * | 9/1972 | Fruits | 43/61 |
| 3,762,093 | A * | 10/1973 | Rohde | 43/83.5 |
| 3,992,803 | A * | 11/1976 | Kaiser | 43/83 |
| 4,155,193 | A * | 5/1979 | MacDonald | 43/67 |
| 4,253,264 | A * | 3/1981 | Souza | 43/73 |
| 4,318,241 | A * | 3/1982 | Fassauer | 43/58 |
| 4,363,183 | A * | 12/1982 | Drdlik | 43/81.5 |
| 4,462,182 | A * | 7/1984 | French | 43/85 |
| 4,557,066 | A * | 12/1985 | Godwin, Jr. | 43/60 |
| 4,569,149 | A * | 2/1986 | Sensing et al. | 43/61 |
| 4,769,942 | A * | 9/1988 | Copenhaver, Sr. | 43/61 |
| 4,831,766 | A * | 5/1989 | Giglietti | 43/61 |
| 5,148,624 | A * | 9/1992 | Schmidt | 43/81 |
| 5,172,512 | A * | 12/1992 | Bodker et al. | 43/81 |
| 5,175,956 | A * | 1/1993 | Hover et al. | 43/58 |
| 5,175,957 | A * | 1/1993 | West | 43/61 |
| 5,305,545 | A * | 4/1994 | Cerullo | 43/72 |
| 5,325,621 | A * | 7/1994 | Giglietti | 43/61 |
| 6,009,661 | A * | 1/2000 | Lloyd | 43/61 |
| 6,125,576 | A * | 10/2000 | Knuppel | 43/74 |
| 6,230,434 | B1 * | 5/2001 | Knuppel | 43/74 |
| 6,523,713 | B1 * | 2/2003 | Helms | 220/831 |
| 7,231,738 | B2 * | 6/2007 | Watson et al. | 43/85 |
| 7,506,471 | B2 * | 3/2009 | Rodgers et al. | 43/85 |
| 7,607,254 | B1 * | 10/2009 | Huang | 43/85 |
| 7,814,702 | B2 * | 10/2010 | Nathan et al. | 43/70 |
| 2007/0266618 | A1 * | 11/2007 | Sturgeon et al. | 43/73 |

FOREIGN PATENT DOCUMENTS

| | | | |
|---|---|---|---|
| GB | 207057 | A * | 11/1923 |
| WO | WO 9509531 | A1 * | 4/1995 |
| WO | WO 2005053392 | A1 * | 6/2005 |
| WO | WO 2005074680 | A1 * | 8/2005 |
| WO | WO 2006130095 | A1 * | 12/2006 |

* cited by examiner

MOUSETRAP

This is a continuation application of U.S. Ser. No. 12/351,374, which in turn is a continuation application of U.S. Ser. No. 10/595,596, which is an application filed under 35 USC 371 of PCT/GB2004/004423.

FIELD OF THE INVENTION

The present invention relates to mousetraps for trapping and/or killing mice, in particular, domestic mice.

BACKGROUND OF THE INVENTION

Mice, although small, can still cause much damage. They destroy articles such as food, books, furniture and even appliances with their gnawing, urine and faeces. Another undesirable trait associated with mice, particularly in domestic environments, is their association with a variety of human diseases, such as for example, asthma. Mice can also spread a variety of organisms that can cause diseases of humans and pets. These include a variety of food poisoning bacteria like *Salmonella, Shigella, Escherichia coli (E. coli)*, and others. While the risk of mouse invasion is able to be somewhat controlled or minimised by preventing food waste such as crumbs accumulating in the home, or ensuring that stored food is isolated from the external environment in, for example, sealed containers, it is not always possible to ensure that no food will be left exposed for a period of time. Also, minimising the risk of mice invasion by sealing of cracks, spaces and openings such as vents, pipes and chimney access points can be an expensive, labour intensive and time consuming exercise and is not always possible.

Traditional methods of dealing with mouse invasion in the home involves the use of poisoned baits (rodenticides) that contain anticoagulants, such as warfarin, pival and chlorophacinone. Such baits, while effective, are nevertheless toxic and are therefore undesirable for use in the home, particularly those in which children and pets reside. In addition, poisoned mice often die in inaccessible locations thereby resulting in an unpleasant odor upon death of the mouse. To circumvent these problems, mousetraps are often employed instead of poisoned baits. Traps are generally preferred as these are less hazardous to use around children and pets. Because mice are caught by the trap, there is less chance of odor from mice dying in wall voids or other inaccessible areas. Mousetraps in the form of wooden-based snap traps are common. While these traps are generally effective, they have the problem of exposing the homeowner, for example, to the highly undesirable task of disposing of the dead mouse once trapped. In addition, once trapped, the exposed dead mouse can pose health problems or cause distress to, for example, children. Furthermore, such traps are also pose a danger to children and pets who may inadvertently activate the trigger and injure themselves. Whilst mousetraps have been developed in which a trap is located within an enclosure in an attempt to isolate the trap from the outside environment and somewhat conceal the dead mouse from view, the enclosure of such mousetraps are not self-sealing after trapping and therefore the home-owner is still exposed to the dead mouse when disposing of the mouse and/or the trap.

While recognising the shortcomings of prior art mousetraps, the present inventors have sought to overcome these deficiencies with a mousetrap that substantially isolates the trap mechanism and a trapped mouse from the external environment. Such traps are desirably simple and cost effective to manufacture and are also able to efficiently trap mice.

SUMMARY OF THE INVENTION

The present invention provides a mousetrap comprising an enclosure comprised of at least a top, a base and a closable aperture; and a trigger mechanism comprising a lever arrangement connected to a biasing means, wherein the aperture, when open, is adapted to admit the mouse into the enclosure and when closed, the trapped mouse is substantially concealed within the enclosure, the mousetrap being set to trap the mouse by manual rotation of the top relative to the base to open the aperture which is held open against the force of the biasing means by engagement of the lever arrangement with a stop means, the mousetrap being activated to trap the mouse by the entry of the mouse into the enclosure causing the lever arrangement to disengage from the stop means thereby causing the top to contra-rotate relative to the base under the force of the biasing means so as to close the aperture, thereby trapping the mouse and substantially concealing the trapped mouse within the enclosure. As such, a mousetrap is provided that is self-closing following the trapping of a mouse. This self-closing feature is particularly desirable as this removes the exposure of the user, for example the homeowner, to the trapped mouse or the need for the user to close the mousetrap once a mouse has been trapped. The mousetrap according to this preferred embodiment is also advantageous as the user is able to readily determine when a mouse has been trapped without the need of actually observing the trapped mouse. A further associated advantage with the mousetraps according to the present invention is increased safety; that is, the enclosure surrounding the trap mechanism prevents, for example, a child or pet from inadvertently setting off the trap and causing possible injury, and also, children and pets are not exposed to trapped or dead mice that can be possible sources of disease.

Preferably, the mousetrap in accordance with a preferred embodiment of the invention further comprises a strike plate connected to the top that extends substantially at right angles to an internal wall of the enclosure such that upon rotation of the top relative to the base under the action of the biasing means, the strike plate rotates with the top and contacts the mouse. In this way, the mouse is contacted by the strike plate thereby incapacitating or killing the mouse. Preferably also, the mousetrap further comprises a catch plate connected to the base and extending substantially at right angles to an internal wall of the enclosure such that upon contra-rotation of the top relative to the base under the action of the biasing means, the strike plate rotates with the top and contacts the mouse to trap the mouse between the strike plate and the catch plate. As such, not only is the mouse struck by the strike plate upon contra-rotation of the top relative to the base, but it is subsequently squashed between the strike plate and the catch plate thereby increasing the effectiveness of the mousetrap to trap, incapacitate or kill the mouse. In a particularly preferred embodiment of the invention, the stop means may also serve as the strike plate, the strike plate being connected to the top and extending substantially at right angles to an internal wall of the enclosure such that upon contra-rotation of the top relative to the base under the action of the biasing means, the strike plate rotates with the top and contacts the mouse.

The mousetrap according to a preferred embodiment of the invention preferably has at least a section of the base and top that is circular. Such sections thereby allow the top and base to rotate relative to each other. For instance, the outer surface of the top and base may be, for example, square or hexagonal in shape, but each of the top and base still having a circular portion so as to be able to be interfitted in such as way as to allow the top and base to rotate relative to one another. In a particularly preferred embodiment of the invention however, the enclosure is circular in shape.

It is envisaged that the mousetrap in accordance with the present invention may be a single-use device (i.e disposable) wherein a user disposes of the mousetrap and the trapped mouse without the need to open the mousetrap and remove the mouse. The mousetrap in accordance with a preferred embodiment of the invention may, however, be reusable such that a user is able to remove and reset the mousetrap. In this regard, so as to assist in the removal of the dead mouse, the mousetrap is able to be disassembled. This feature also advantageously assists in the cleaning of the mousetrap after removal of a dead mouse prior to resetting the mousetrap.

In a particularly preferred embodiment, the biasing means is a helical torsion spring. Alternative biasing means such as elastic materials, spring metals in leaf or flat spring form, or compression springs or any other biasing means known to persons skilled in the art.

So as to assist in the incapacitation or killing of mice, the mousetrap according to a preferred embodiment of the invention also includes one or more spikes extending from the strike plate thereby impaling the mouse upon contact. Alternatively, the strike plate and/or catch plate may further include one or more projections that assist in striking and kill of the mouse. In a particularly preferred embodiment, the projections are in the form of angular kinks in the strike and/or catch plate profiles.

It is envisaged that the mousetrap according to yet another preferred embodiment will further comprise a bait housing. Preferably, the bait housing is located in the centre of the enclosure. In this way, the mouse has to enter the maximum distance into the mousetrap enclosure before activating the trap. This ensures that the mouse is fully enclosed within the enclosure before trap occurs, thereby substantially concealing all parts of the trapped mouse from external view. Preferably also, the bait housing is able to be loaded with bait from the underside of the enclosure base. This makes the mousetrap easy and efficient to load with bait without the need for disassembly of the mousetrap. Once the bait is positioned, through the underside of the mousetrap, in place, the bait may be retained in position with a seal, such as, for example, an adhesive label that is able to be peeled back to insert the bait into the bait housing and subsequently adhered to maintain the bait in position. Preferably also, the bait housing is configured so that the bait is physically isolated from the enclosure wherein the bait housing comprises one or more vents to allow the bait to be sensed by the mouse. The bait housing may still further include one or more spikes that assist in maintaining the bait within the bait housing. Also envisaged is the mousetrap may be provided to the consumer with bait located within the bait housing. In this way, baits such as grains, nuts or seeds presented as whole or broken pieces, or as the base for paste, gel, pellet, or extruded or moulded wax-block formulations with or without additional pheromone or animal- or plant-derived ingredients, are able to stored long-term within the mousetrap and sold as a single unit to the consumer.

In a particularly preferred embodiment, the mousetrap according to a preferred embodiment of the invention further includes a lip adapted to fit around the top of another mousetrap thereby allowing two or more mousetraps to be stacked. This is particularly advantageous when the mousetraps are displayed for sale in multiple units per pack.

The present invention also provides a mousetrap comprising an enclosure having an aperture through which a mouse enters and an enclosure floor; the mousetrap further comprising a trap mechanism disposed within the enclosure; the trap mechanism comprising at least a biasing means, a trigger and a trap wire with the trap wire being connected to the biasing means and arranged so as to allow the trap wire to be set through engagement with the trigger, to a first position against the force of the biasing means in which the mousetrap is set to trap a mouse; the trap mechanism being arranged such that entry of the mouse into the enclosure and depression of the trigger by the mouse causes the trigger to disengage from the trap wire which, through the force of the biasing means, is caused to move from the first position to a second position thereby trapping the mouse between the trap wire and floor, wherein the trigger and opening are arranged so as to substantially conceal and isolate the trapped mouse from the external environment. Preferably the trap mechanism further comprises a trap base. More preferably, the trap base is a wire support base. In a particularly preferred embodiment of the invention, the trap base is formed from a substantially rigid material. Suitable materials are injection mouldable materials such as plastic material polyethylene, polypropylene, ABS, and polystyrene. In this way, when a relatively bendable enclosure such as, for example, an enclosure fabricated from cardboard is used, the unit is able to withstand higher stress loads on the enclosure without compromising the operation of the trap mechanism. While cardboard is a particularly preferred material for the enclosure, other suitable materials include sheet polypropylene, polyethylene, polyvinyl and acetate. While a particularly preferred shape for the mousetrap enclosure is a wedge-shaped box, other shapes are conceivable such as rectangular, cylindrical or conical shaped enclosures or folding concertina shapes which are of a size adapted to accommodate a mouse, yet are still small enough so that the mouse is in a relatively confined space within the enclosure. Although it is envisaged that the mousetraps are for single-use (i.e, disposable after a mouse is trapped), the mousetraps may also be reusable. In this regard, so as to assist in the removal of the dead mouse, the mousetrap is able to be disassembled. This feature also advantageously assists in the cleaning of the mousetrap after removal of a dead mouse prior to resetting the mousetrap.

In a particularly preferred embodiment, the trap mechanism further comprises a bait housing. Preferably, the bait housing is situated on the trigger at a position so as to achieve a maximum possible distance between the bait and the enclosure opening is achieved. This ensures that the mouse is completely within the enclosure before trap occurs.

The present invention will now be described in detail with reference to a number of preferred embodiments as illustrated in the accompanying figures.

BRIEF DESCRIPTION OF THE FIGURES

FIGS. 4b and 4c depict perspective views of the top (FIG. 4b)

and the lever arrangement (FIG. 4c) in accordance with another preferred embodiment of the invention. In FIG. 4b, the top is shown from the underside with the stop means located in the top interior. In FIG. 4c, the releasable catch means located on the lever arrangement is shown.

DETAILED DESCRIPTION OF THE INVENTION

Figure 1:
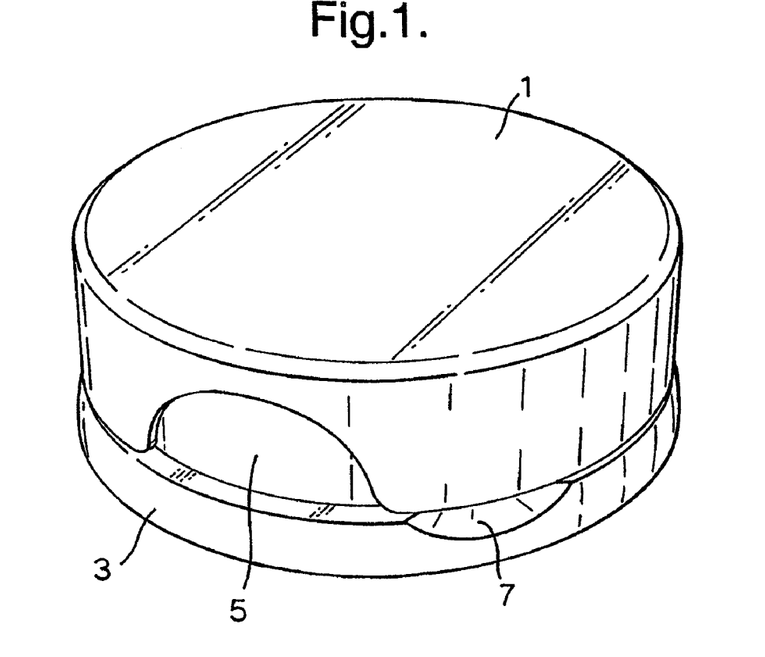
FIG. 1 depicts a perspective view the mousetrap according to a preferred embodiment of the invention wherein the top and base are in the closed position.
Figure 2:
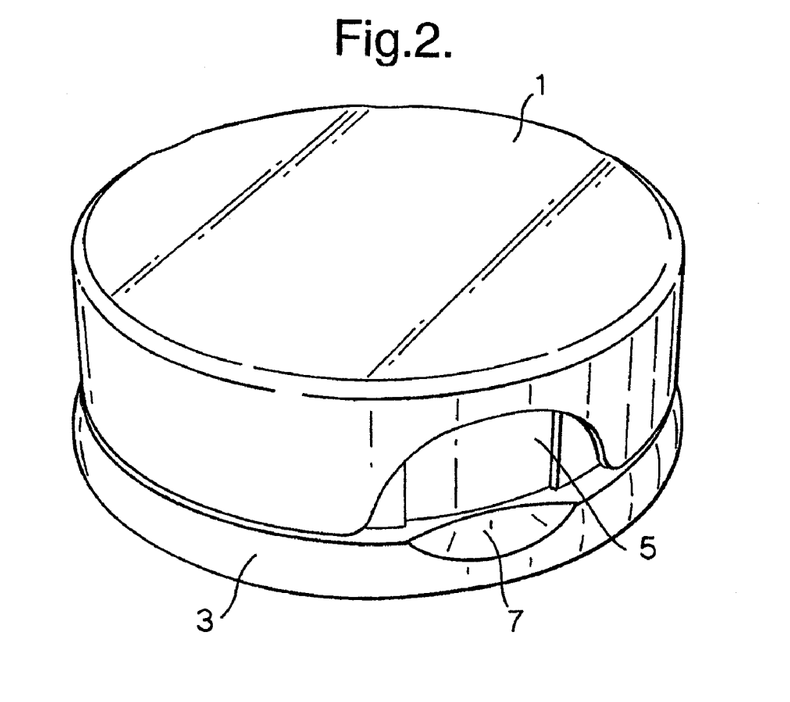
FIG. 2 depicts a perspective view of the mousetrap according to FIG. 1 wherein the top and base are set in the set state ready for trapping a mouse.

Referring to FIGS. 1 and 2, the mousetrap according to a preferred embodiment of the invention includes an enclosure comprising a top (1), a base (3) and a closable aperture (5) within which a mouse is able to enter when the enclosure is in an open position. The mousetrap of FIG. 1 depicts the enclosure in a closed position. The enclosure is able to be moved from the closed position to the open position by the substantial alignment of the aperture (5) in the top (1) and the base (3). (see FIG. 2) To set the mousetrap enclosure from the closed position to an open position, the user, such as a homeowner, manually rotates the top relative to the base (3) in the counter-clockwise direction until the indentation (7) is aligned with the aperture (5). FIG. 2 shows the mousetrap when in the set position in which the aperture (5) and the indentation (7) are aligned.

Figure 3:
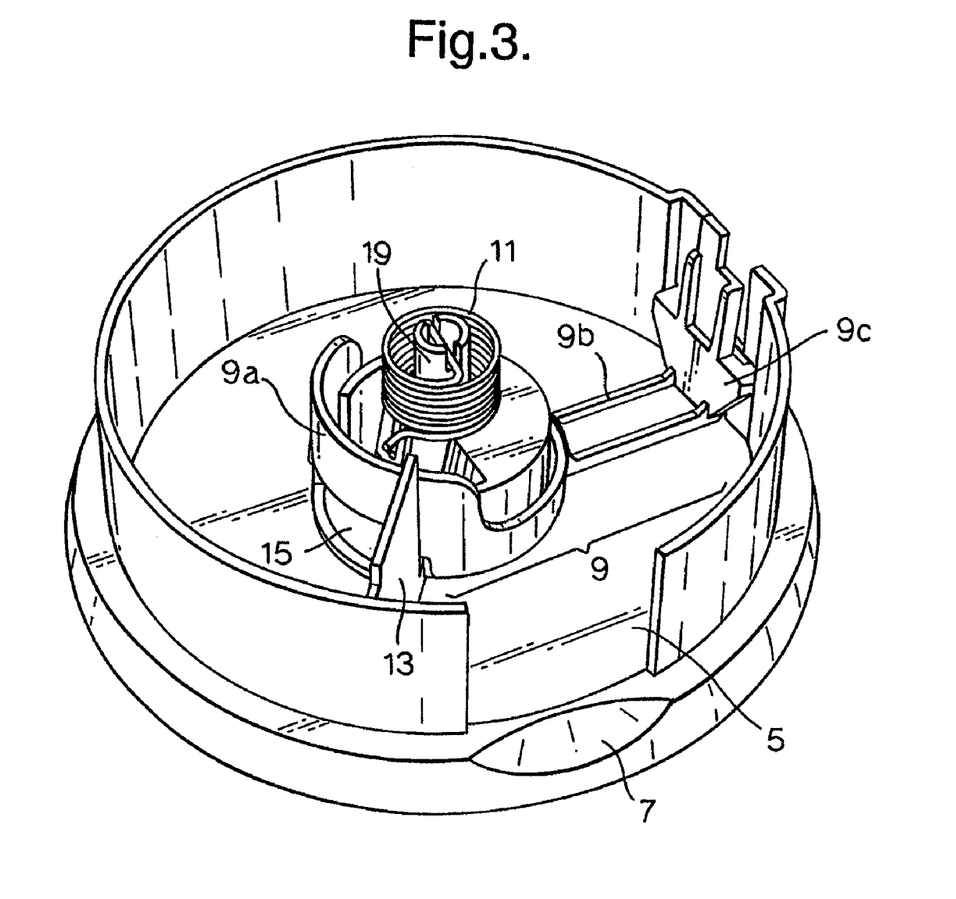
FIG. 3 depicts a perspective view of the mousetrap according to FIG. 1 wherein a portion of the top has been omitted thereby revealing the internal parts of the mousetrap.

In order to more fully describe the mousetrap according FIGS. 1 and 2, the mousetrap is depicted in FIG. 3 with the top (1) omitted so as to show the internal parts of the mousetrap. The internal parts of the mousetrap comprise a trigger mechanism comprised of a lever arrangement (9) and a biasing means (11). Once the mousetrap has been set (i.e., the aperture is in the open position), a mouse will enter the enclosure through the aperture (5). The lever arrangement (9), when the mousetrap is in the set position, is engaged to a stop means (13a) by virtue of a lever (9a) having a arm (9b), connected to a pivot means (9c). The pivot means (9c) allows the lever (9a) to be raised. Mice are very inquisitive animals and will thoroughly explore a new object put in their environment. In particular, mice will burrow and nest in confined spaces and they like to move with their body in contact with a wall. Generally, mice prefer small, tunnel-like or narrow-sided angular enclosures that have dark interiors. Dark interiors are generally explored before light interiors. As such, the configuration of the mousetrap according to this preferred embodiment is particularly attractive as the top (1) and base (3), fabricated from opaque materials, effectively form a tunnel-like enclosure with a dark interior.

Figure 4A:
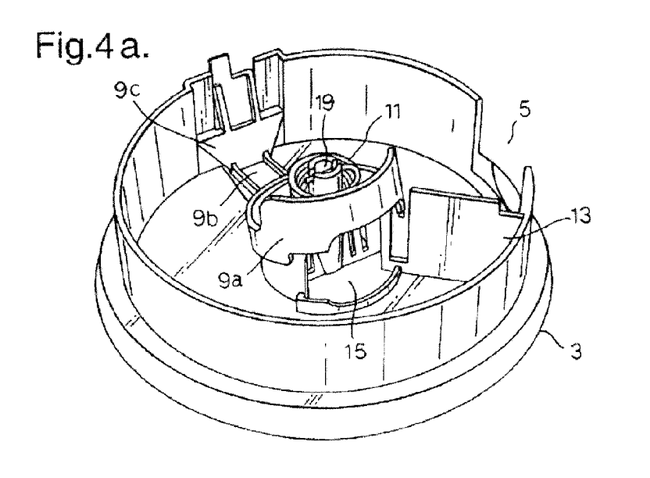
FIG. 4a depicts a perspective view of the mousetrap according to FIG. 3 showing how the trigger is activated.

FIG. 4a shows how the mousetrap interior parts interact to allow the mousetrap to be set to trap a mouse and activated once a mouse has been trapped in accordance with a preferred embodiment of the invention. To set the trap, a user manually rotates the top (1) which is connected to a biasing means (11) in the anti-clockwise direction against the force of the biasing means (11) thereby storing potential energy within the biasing means (11). The top (1) is held in position (so that the aperture (5) is open) by engagement of the lever (9a) located on the lever arrangement (9) with a stop means (13a). The mouse being an inquisitive creature, will enter the enclosure through the aperture (5) and travel through the enclosure in the anti-clockwise direction until it reaches the lever (9a). Due to its inquisitive nature and/or to the attractive odor of the bait, it will attempt to crawl through the gap (15) thereby causing the lever (9a) to raise. As the lever (9a) is raised, it disengages the stop means (13a) causing the top to contra-rotate under the force of the biasing means so that the enclosure assumes the closed position (as is depicted in FIG. 1).

Figures 4B, 4C:
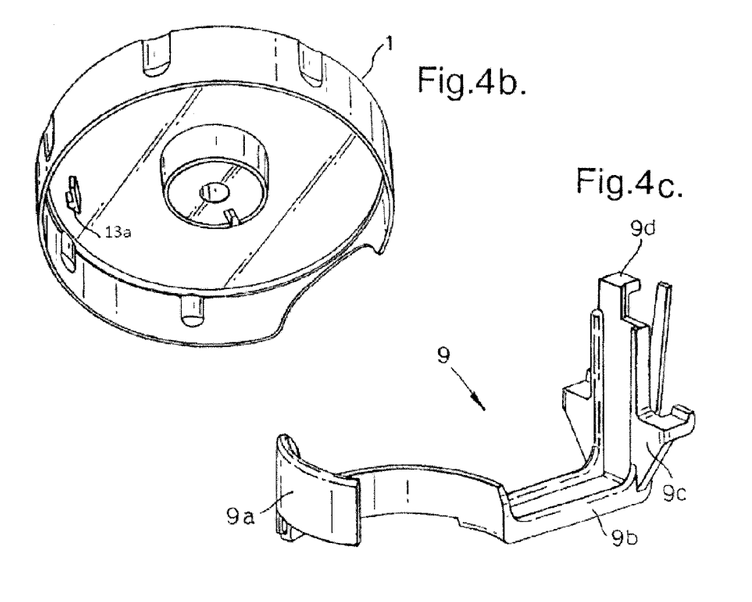

In another preferred embodiment of the invention, the enclosure is maintained in the open position against the force of the biasing means (11) by engagement of the stop means (13a) located in the interior of the top (1) (as depicted in FIG. 4b) with a releasable catch means (9d) located on the lever arrangement (9) as shown in FIG. 4c. As the mouse crawls through the gap (15) and raises the lever (9a), the lever arrangement (9) pivots by the pivot means (9c) and causes the releasable catch means (9d) located on the lever arrangement (9) to disengage the stop means (13a). Once the lever arrangement (9) disengages the stop means (13a), the top (1) contra-rotates relative to the base (3) under the action of the biasing means (11) so that the enclosure assumes the closed position (as depicted in FIG. 1).

Figure 5A:
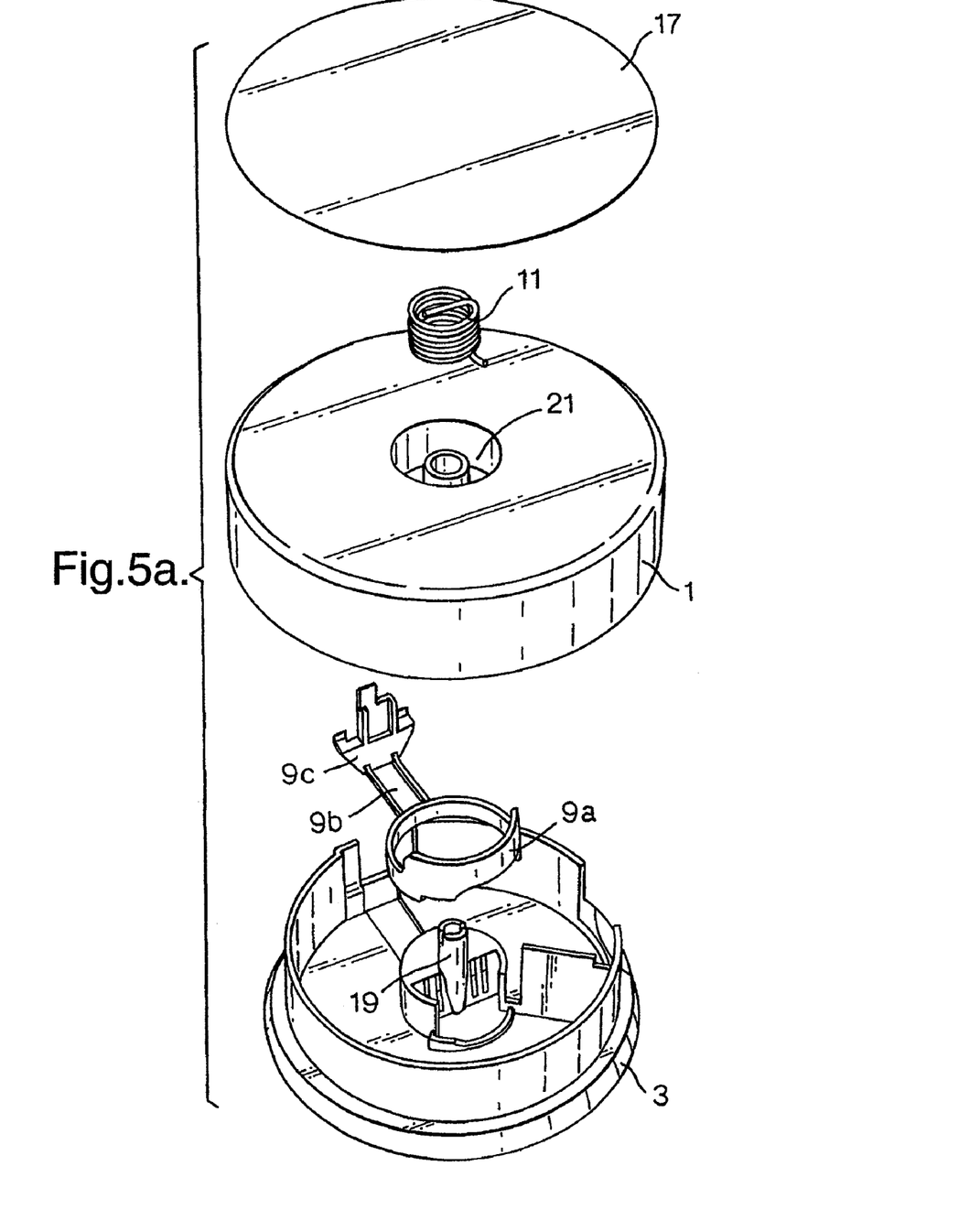
FIGS. 5a, 5b and 5c depict, respectively, an exploded view of the mousetrap according to FIG. 1 showing the working interrelation of the internal parts of the mousetrap, a sectional view of the mousetrap and a perspective view showing the underside of the mousetrap.
Figure 5B:
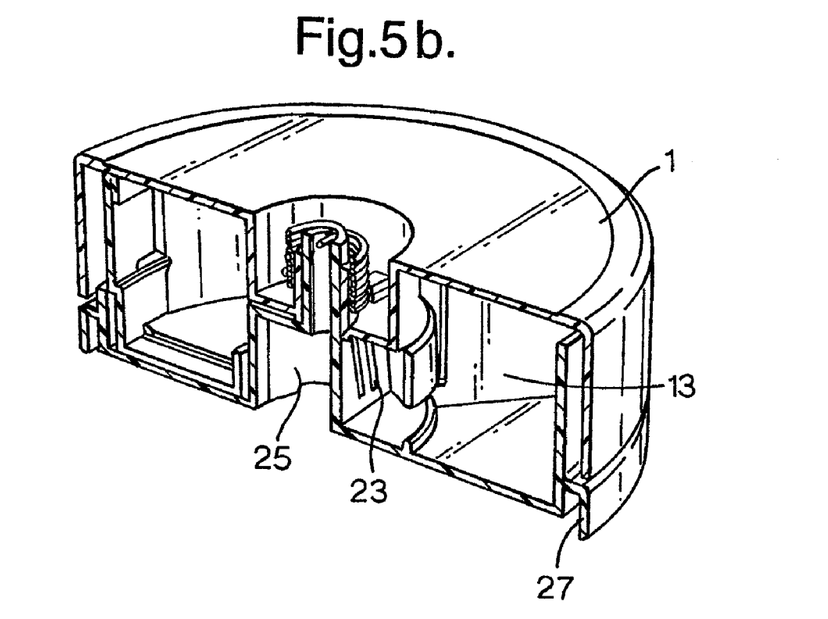
Figure 5C:
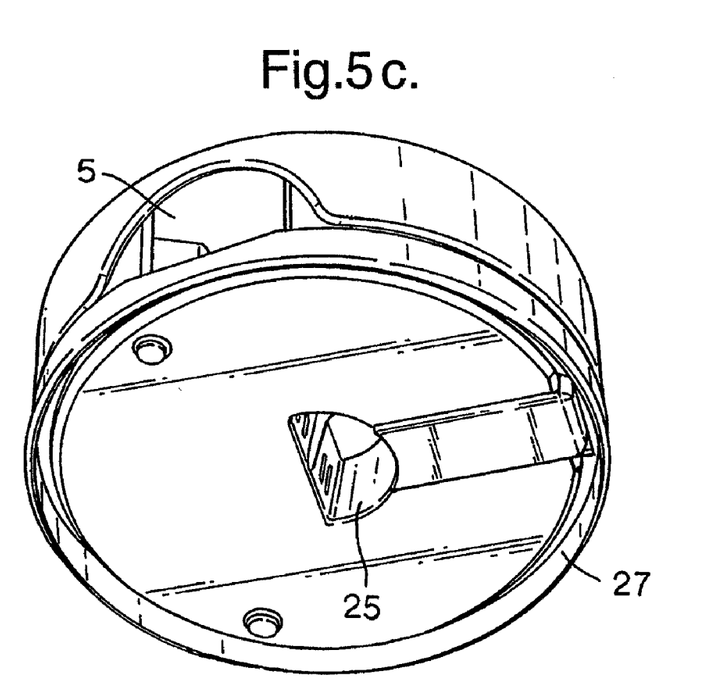

The way in which the mousetrap is assembled is depicted in FIGS. 5a and 5b in which the mousetrap component parts are shown, respectively, in an exploded view in vertical alignment and also in section view. The mousetrap, in accordance with this particular embodiment, is fabricated from an injection mouldable material such as polypropylene and ABS, however materials such as polyethylene and polystyrene would also be suitable. Most of the component parts are adapted to snap into position and are assembled by a layering arrangement wherein the parts are sequentially arranged in position from the base (3) to the label (17) in the following way: the base (3) comprising a stop means (13a) is adapted to retain a lever arrangement (9) that fits about a spindle (19), followed by positioning of the top (1) with the biasing means (11) inserted in a cavity (21) within the top (1). The biasing means is operably connected to the top (1) and the base (3). In particular, FIG. 4a depicts how the biasing means fits in relation to the base (3) and in particular, the spindle (19) forming part of the base (3). The label (17) is then positioned over the top (1) so as to conceal the biasing means (11). FIG. 5b shows the sectional profiles of the top (1) and the base (3) to more clearly describe one possible method of configuring the top (1) and base (3) in such a way so that when in relation with the biasing means (11), contra-rotation of the top (1) relative to the base (3) under the force of the biasing means (11) is achieved. Also shown in this embodiment are the bait vents (23) which allow the mouse to sense the bait (not shown) when placed within the bait housing (25). FIG. 5c shows the underside of the mousetrap, showing in particular, the bait housing (25) and how the bait may be inserted within the bait housing (25). This figure also shows the lip (27) on the base which allows one mousetrap to be stably and efficiently stacked on another mousetrap in accordance with a preferred embodiment of the invention.

Figures 6A, 6B, 7A, 7B:
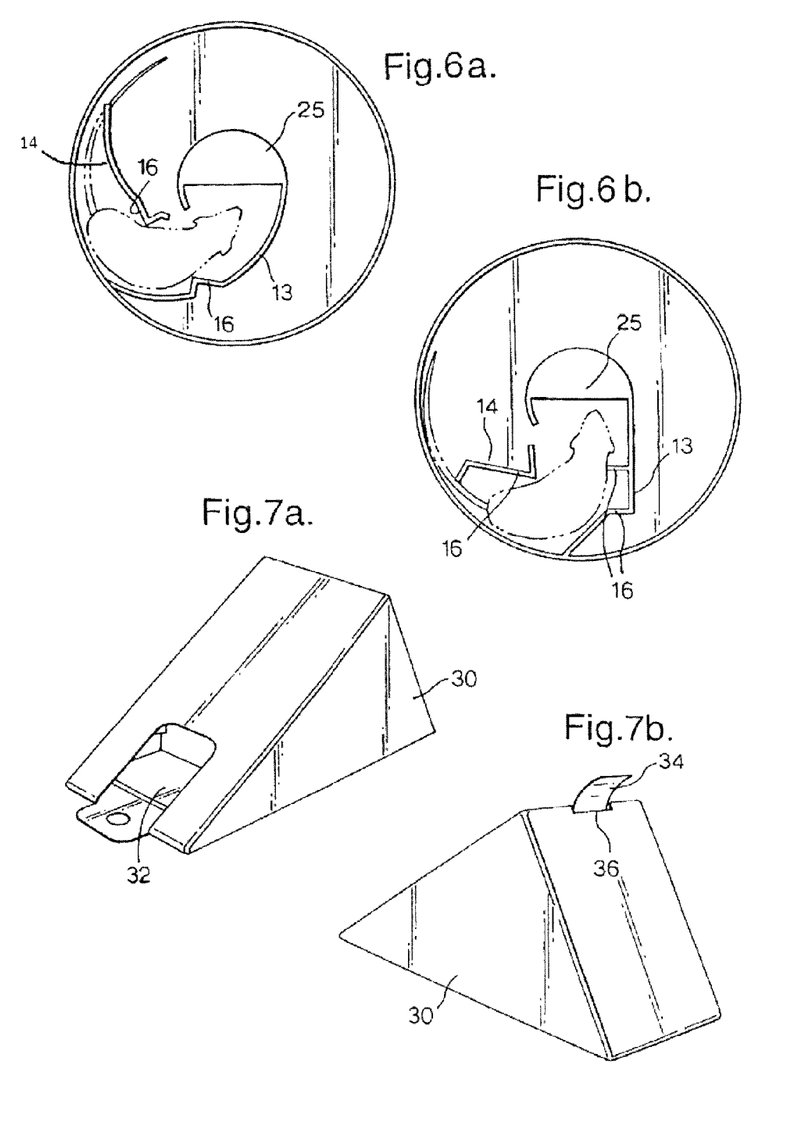
FIGS. 6a and 6b depict plan views of two preferred embodiments of the mousetrap according to the invention, that show, in particular, preferred strike and catch plate configurations.
FIGS. 7a and 7b depict perspective views of a mousetrap according to another preferred embodiment of the invention in which the mousetrap is shown from the front (FIG. 7a) and from the rear (FIG. 7b).

Referring to FIGS. 6a and 6b, a mousetrap is depicted having stop means (13a) (in this embodiment the stop means also acts as a strike plate) (14) and a catch plate (13) that are be configured so as to have one or more projections (16). By virtue of these projections, more efficient incapacitation and/or kill of the mouse upon contact is achieved. In a particularly preferred embodiment, the projections are in the form of angular kinks in the strike and/or catch plate profiles. FIG. 6a depicts a mousetrap having a curved strike plate (14) profile and a curved catch plate (13) profile. The curved strike plate (14) profile assists in guiding the mouse to the bait housing (25) while the projections (16) on the strike plate (14) and catch plate (13) aim to increase the impact force on the mouse. FIG. 6b depicts a mousetrap having a strike plate (14) having multiple projections (16) (in this case in the form of a kink and a spike) and a catch plate (13) wherein the multiple projections (16) allow for different points of contact with the mouse thereby increasing the efficiency of incapacitation and/or kill.

Referring now to FIG. 7a, the mousetrap in accordance with another preferred embodiment of the invention is depicted in which a front perspective view of mousetrap depicts the enclosure (30) having an aperture (32) through which a mouse is able to enter. A rear perspective view of the mousetrap is depicted in FIG. 7b. This figure also depicts a slot (34) through which a tag (36) protrudes wherein the tag (36) is connected to the trap wire located with the enclosure interior. In this way, the trap wire (shown in FIG. 9a) is able to be set by a user externally of the enclosure (30).

Figure 8A:
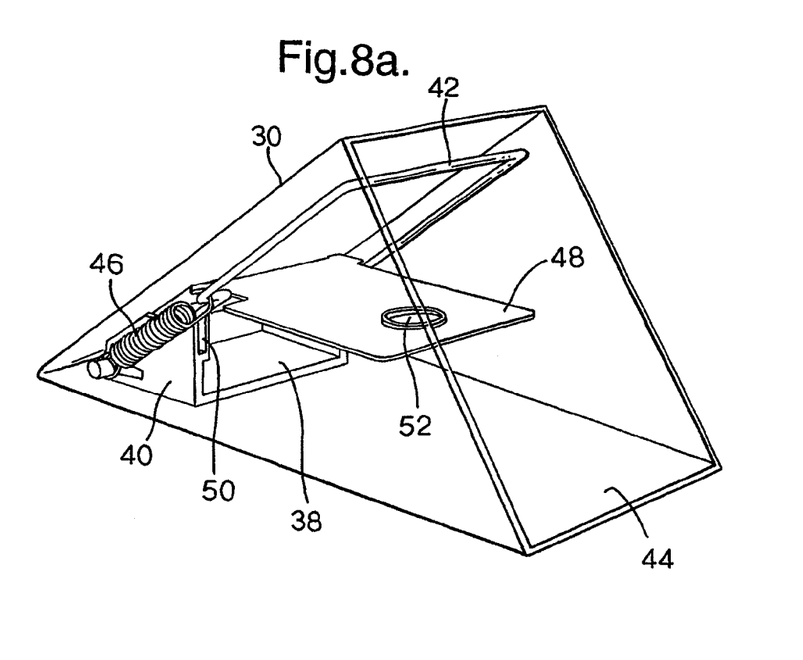
FIGS. 8a and 8b depict, respectively, a perspective view of the mousetrap according to a preferred embodiment of the invention wherein the enclosure is shown as transparent body for the purpose of depicting trap mechanism location within the enclosure wherein the trap wire is in the set position and a perspective view of the mousetrap according to FIG. 8a wherein the trap wire is in the trap position.
Figure 8B:
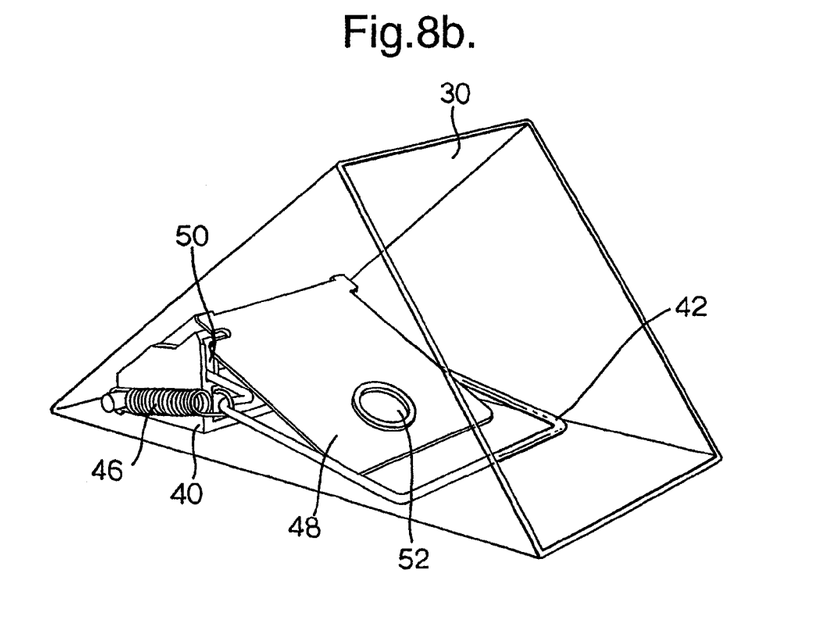

FIGS. 8a and 8b show how the trap mechanism is disposed within the enclosure (30). In FIG. 8a, the trap mechanism is in the set position in which the mouse, upon entry through the aperture (32, see FIGS. 7a, 7b), will travel through a gap (38) in the trap base (40) towards the rear of the enclosure (30). Once the trap wire (42) is caused to move from a first position as is depicted in FIG. 8a to a second position as is depicted in FIG. 8b, the mouse will be trapped between the trap wire (42) and the enclosure floor (44).

Figure 9A:
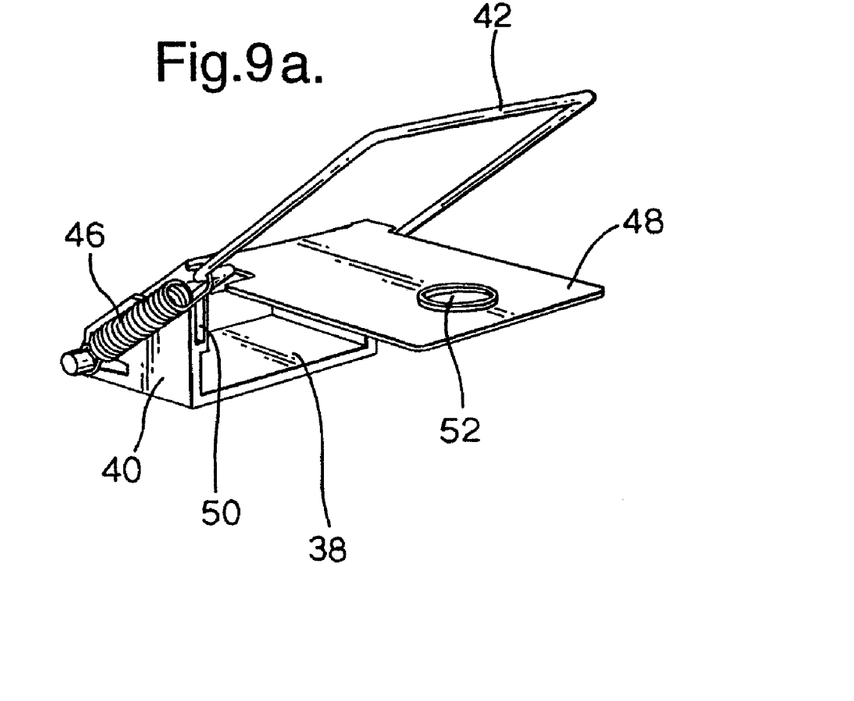
FIGS. 9a and 9b depict, respectively, a perspective view of the trap mechanism according to a preferred embodiment of the invention wherein the trap wire is in the set position and a perspective view of the trap mechanism according to a preferred embodiment of the invention wherein the trap wire is in a trap position.
Figure 9B:
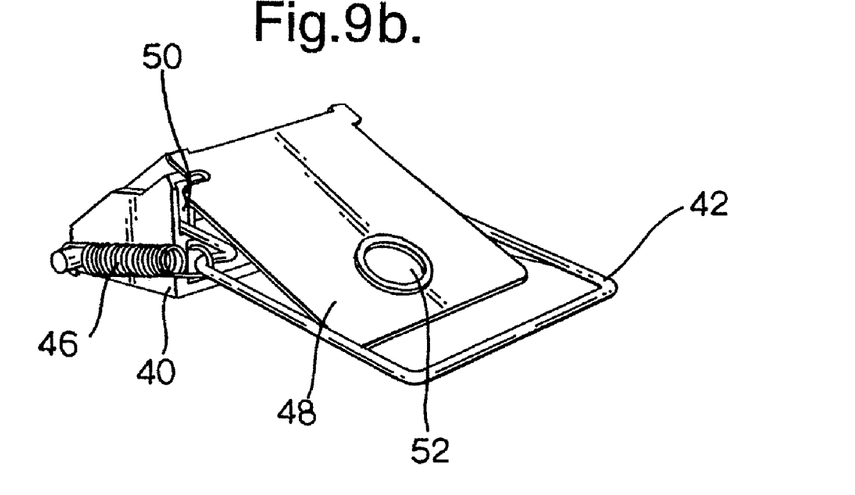

The trap mechanism according to a particularly preferred embodiment of the invention is depicted in the absence of the enclosure in FIGS. 9a and 9b. In this embodiment, the trap mechanism comprises a trap base (40), to which is connected a biasing means (46), a trigger (48) and the trap wire (42). The trap wire (42) is able to move from a first position (the trap position) (as is depicted in FIG. 9b) to a second position (the set position) (as is depicted in FIG. 9a) by pivot movement within a recess (50) formed within the trap base (40). To set the mousetrap, a user lifts and engages the trap wire (42) in the set position, the trap wire being retained in the set position against the force of the biasing means (46) by virtue of the shape of the base recess (50). That is, the trap wire (42), is held in the second (or set position) against the force of the biasing means (46) by an "over centre" spring action whereby the biasing means is extended, thereby storing potential energy, to an over-centre position and held in this over-centre position by engagement with an abutment (not shown) located within the recess (50). Upon depression of the trigger (48) by the mouse, the biasing means (46) is caused to contract past the over-centre position at which point the biasing means continues to contract, by release of the stored potential energy, causing the trap wire to move from the first to the second position thereby trapping the mouse. The trigger (48) is adapted so that it too is raised as the trap wire (42) is raised from the second (trap) to the first (set) position. Preferably, bait (not shown) is positioned on a bait housing (52) however due to their inquisitive nature, mice will still stand and depress the trigger (48) in the absence of bait. This will cause the trigger (48) to disengage from the trap wire (42), which through the force of the biasing means, will cause the trap wire (42) to move from the first (set) position to the second (trap) position, thereby trapping the mouse between the trap wire (42) and the enclosure floor (44). In this particular embodiment, the base is preferably formed from a injection mouldable component that is substantially rigid so as to withstand any stresses, such as bending or distortion of the enclosure, such that, advantageously, the trap mechanism is still able to function. In this way, the enclosure (30) may be fabricated out of a cheap material such as, for example, cardboard, but is still able to withstand any stress loads imposed on the mousetrap enclosure (30). Preferably, the trap base (40) is fabricated from ABS although materials such as polypropylene, polystyrene, pressed or folded metal, and wire forms are also suitable. It will be appreciated that the configuration of the trigger (48) in relation to the aperture (32) is such that after the mousetrap has been activated (or triggered), the aperture (32) is substantially closed so as to substantially conceal and isolate the trapped mouse from the external environment.

Figure 10:
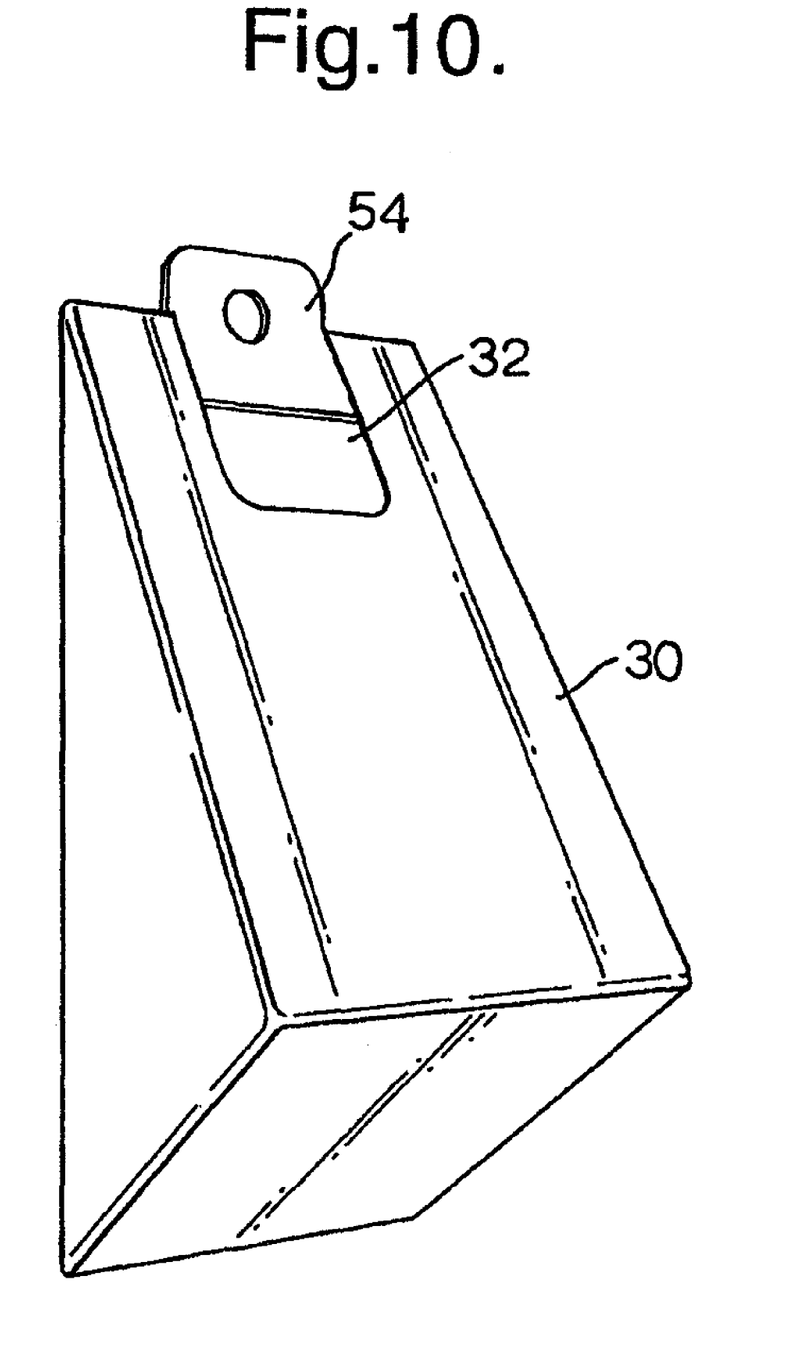
FIG. 10 depicts a perspective view of the mousetrap according to another preferred embodiment of the invention in which a means for hanging the device is provided.

FIG. 10 depicts the mousetrap hung from, for example, a wall by a hang portion (54). In this way, the tab is used with pins, nails or screws to anchor the trap to narrow, raised surfaces such as, for example, shelves, roof or floor beams, rafters or ledges along which mice might be habitually travelling. The hang portion (54) may even be used for display or storage purposes.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:
1. A mousetrap comprising:
an enclosure comprising a base, an upwardly extending spindle, a top rotatable about said spindle, a strike plate connected to the top that extends downwardly into an interior of the enclosure and is at a substantially right angle to the top and which rotates with the top, a catch plate connected to the base and extending upwardly into the enclosure and at a substantially right angle with respect to the base, wherein the strike plate and the catch plate are adapted to trap a mouse therebetween, and
a trigger mechanism comprising a lever arrangement and a biasing means operably connected to the top and the base,
the mousetrap being set to incapacitate or kill the mouse by manual rotation of the top relative to the base, the enclosure being held open against a force of the biasing means by engagement of the lever arrangement with a stop means,
the mousetrap being activated to incapacitate or kill the mouse by disengaging the lever arrangement from the stop means in response to the mouse within the enclosure thereby causing the top to contra-rotate about said spindle and relative to the base under a force of the biasing means so as to cause the strike plate to move with the top and strike the mouse with the strike plate and thereby incapacitating or killing the mouse between the strike plate and the catch plate within the enclosure.

2. The mousetrap according to claim 1 wherein at least one of the strike plate and catch plate includes one or more projections.

3. The mousetrap according to claim 2 wherein the one or more projections are in the form of angular kinks in profiles of the strike plate and catch plate.

4. The mousetrap according to claim 2 in which the one or more projections are in the form of spikes adapted for impaling the mouse upon contact.

5. The mousetrap according to claim 1 in which at least sections of the base and top are circular.

6. The mousetrap according to claim 1 in which the enclosure is at least partially circular in shape.

7. The mousetrap according to claim 1 in which the mousetrap is reusable and therefore able to be disassembled so as to allow the removal of an incapacitated or killed mouse prior to resetting the mousetrap.

8. The mousetrap according to claim 1 in which the biasing means is a helical torsion spring.

9. The mousetrap according to claim 1 further comprising a bait housing.

10. The mousetrap according to claim 9 wherein the bait housing is located in a center of the enclosure.

11. The mousetrap according to claim 9 wherein the bait housing is able to be loaded with bait from an underside of the enclosure base.

12. The mousetrap according to claim 9 in which the bait housing is configured so that the bait is physically isolated from the enclosure wherein the bait housing comprises one or more vents to allow the bait to be sensed by the mouse.

13. The mousetrap according to claim 9 wherein the bait housing further includes one or more spikes that assist in maintaining the bait within the bait housing.

14. The mousetrap according to claim 9 wherein the mousetrap is provided to a consumer with bait located within the bait housing.

15. The mousetrap according to claim 1 wherein the base further includes a lip adapted to fit around the top of another mousetrap thereby allowing two or more mousetraps to be stacked.

16. The mousetrap according to claim 1 wherein the mouse is incapacitated or killed within the enclosure and between the strike plate and the catch plate, and after being incapacitated or killed is retained within the enclosure and between the strike plate and the catch plate.

17. The mousetrap according to claim 1 wherein after the mouse is incapacitated or killed within the enclosure and between the strike plate and the catch plate, and after being incapacitated or killed is retained within the enclosure and between the strike plate and the catch plate, the top of the mousetrap is rotatable with respect to the base to release the killed or incapacitated mouse from between the strike plate and the catch plate and to remove the mouse from the enclosure.

* * * * *